May 5, 1925.  1,536,514
F. W. MEHLS
CUTTING MECHANISM FOR HARVESTING MACHINES
Filed Feb. 12, 1923  2 Sheets-Sheet 1
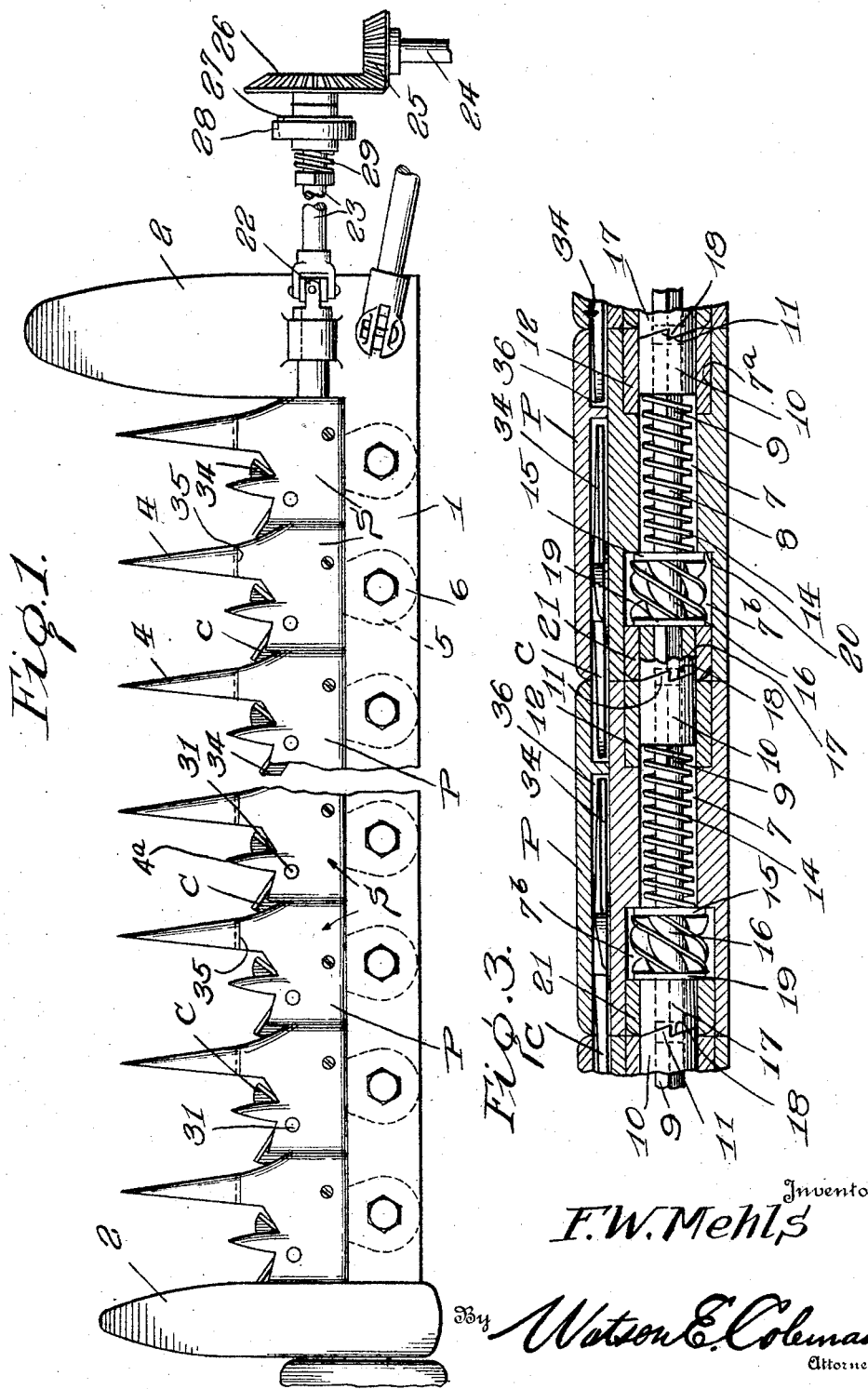
Inventor
F. W. Mehls
By Watson E. Coleman
Attorney

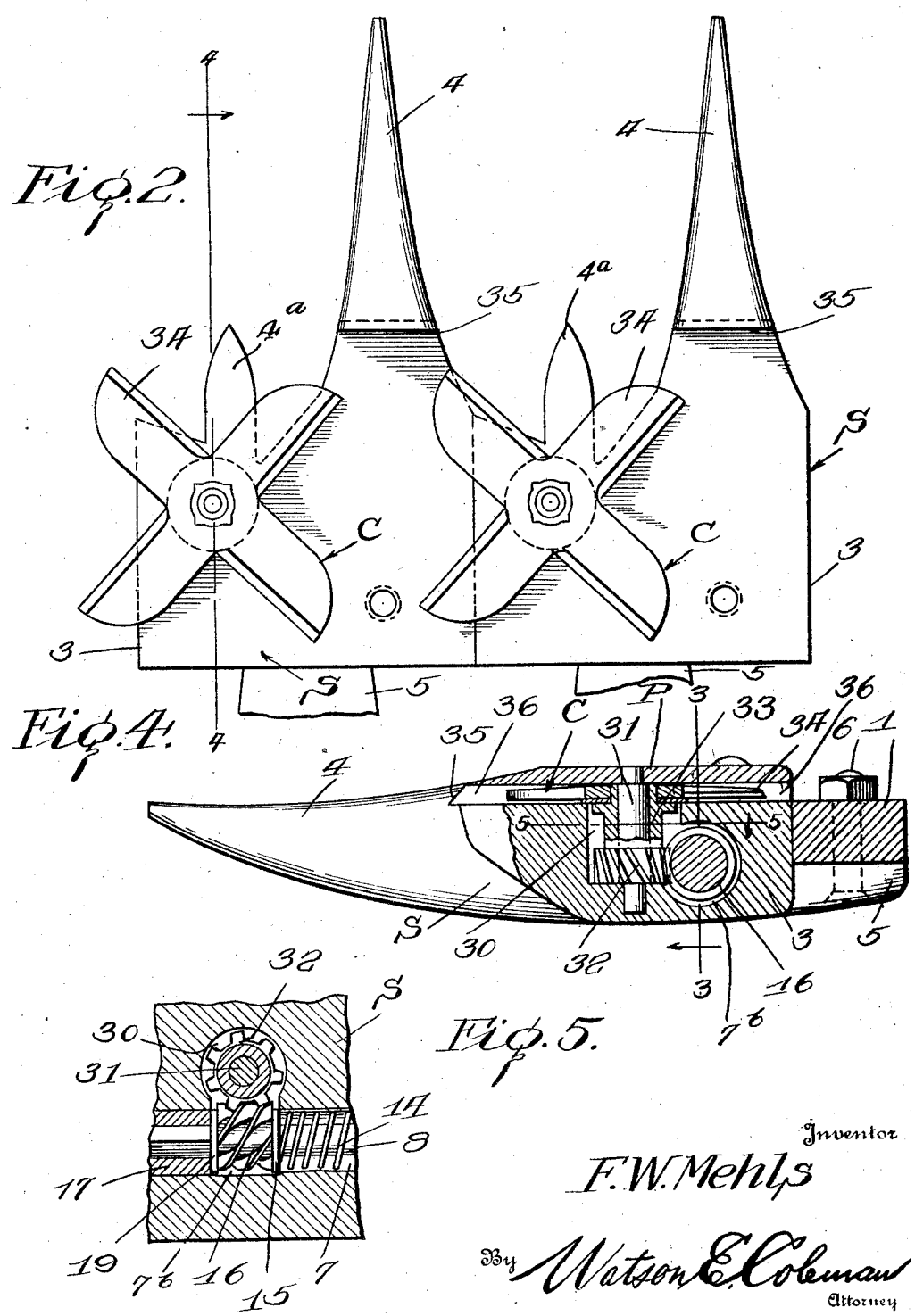

Patented May 5, 1925.

1,536,514

UNITED STATES PATENT OFFICE.

FREDERICK W. MEHLS, OF THIEF RIVER FALLS, MINNESOTA, ASSIGNOR OF FORTY-NINE ONE-HUNDREDTHS TO JOHN H. FULTON, OF THIEF RIVER FALLS, MINNESOTA.

CUTTING MECHANISM FOR HARVESTING MACHINES.

Application filed February 12, 1923. Serial No. 618,577.

*To all whom it may concern:*

Be it known that I, FREDERICK W. MEHLS, a citizen of the United States, residing at Thief River Falls, in the county of Pennington and State of Minnesota, have invented certain new and useful Improvements in Cutting Mechanisms for Harvesting Machines, of which the following is a specification, reference being had to the accompanying drawings.

This invention relates to certain improvements in cutting mechanisms of harvesting machines and it is an object of the invention to provide a novel and improved device of this general character comprising a guard consisting of a plurality of separable sections and wherein each of said sections carries a rotatable cutting element.

It is also an object of the invention to provide a novel and improved device of this general character wherein the cutting mechanism embodies a guard consisting of a plurality of sections, each of said sections carrying a rotating cutting member together with means for driving all of the cutting members from a single source of power.

The invention consists in the details of construction and in the combination and arrangement of the several parts of my improved cutting mechanism for harvesting machines whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a cutting mechanism for a harvesting machine constructed in accordance with an embodiment of my invention;

Figure 2 is an enlarged fragmentary view in top plan of adjacent sections comprised in the cutting mechanism;

Figure 3 is a sectional view taken substantially on the line 3—3 of Figure 4;

Figure 4 is a sectional view taken substantially on the line 4—4 of Figure 2, with the top or cover plate in position;

Figure 5 is an enlarged fragmentary sectional view on the line 5—5 of Figure 4 illustrating in detail a portion of the driving means for the rotating cutting elements carried by the sections.

As disclosed in the accompanying drawings, 1 denotes a finger bar connected to the machine proper in a conventional manner and which is provided adjacent each end with a conventional shoe 2. Associated with the bar 1 is a plurality of guard sections S.

The guard sections S are of duplicate construction and each comprises a body 3 provided with the forwardly directed fingers 4 and smaller fingers 4ª. The rear wall of the body 3 is provided with an outstanding perforated ear 5 which underlies the bar 1 and whereby the section is held to said bar 1 by the coacting nut and bolt 6 or otherwise as may be preferred. The sides of each of the sections S are straight and at right angles to the longitudinal axis of the body so that when the section is applied the sides thereof will have close contact with the sides of the adjacent sections.

The body 3 at its rear portion has disposed therethrough the longitudinally directed bore 7 having its opposite end portions as at 7ª and 7ᵇ enlarged.

Disposed through the bore 7 is a shaft section 8 having one end portion provided with a reduced extension 9 angular in cross section and on which extension is slidably mounted a sleeve 10 provided at its outer end with the ratchet teeth 11 whereby said sleeve 10 serves as a coupling device. The sleeve 10 is snugly engaged within a bushing 12 fitted within the enlarged portion 7ª of the bore 7.

The sleeve or clutch element 10 is constantly urged outwardly by the expansible member 14 herein disclosed as a coil spring encircling the intermediate portion of the shaft 8 and interposed between the sleeve 10 and a washer 15 surrounding the shaft 8. This washer 15 is immediately adjacent to a worm 16 carried by the shaft 8. Mounted on the shaft 8 outwardly of but immediately adjacent to the worm 16 is a second sleeve or coupling device 17 provided at its outer end with the ratchet teeth 18 whereby the sleeve 17 also serves as a clutching member, said sleeve being keyed to the shaft 8 for rotation therewith. Interposed between the worm 16 and the inner end of the sleeve 17 is a washer 19.

The worm 16 is positioned at the inner part of the second enlarged portion 7ᵇ of the bore 7 with the washer 15 in contact with the shoulder 20 whereby endwise movement of the shaft in one direction is prevented. Endwise movement of the shaft 8 in the opposite direction is prevented by contact of the washer 19 with the inner end of the bushing 21 inserted within the second enlarged portion 7ᵇ outwardly of but immediately adjacent to the worm 16.

When the sections S are assembled upon the bar 1 the sleeve 10 of one of said sections is operatively engaged with the sleeve or clutch member 17 of an adjacent section so that under normal conditions the shafts 8 and all of the sections may rotate in unison.

The shafts 8 may be rotated in any desired manner and as herein disclosed an end section S has its shaft 8 coupled by a universal joint 22 with a shaft 23. The shaft 23 is adapted to be driven in any desired manner but preferably from a movable part of the harvesting machine proper. As disclosed in Figure 1, 24 diagrammatically indicates a drive shaft operatively engaged by the gear 25 with a gear 26 loosely mounted upon the shaft 23. The gear 26 is provided with a clutch element 27 with which is normally engaged a clutch element 28 mounted for sliding movement upon the shaft 23 but rotating therewith. The clutch element 28 is normally maintained in working engagement with the clutch element 27 by the expansible member or spring 29 but upon undue resistance being offered to the rotation of the shaft 23 the clutch element 28 will yield sufficiently to prevent continued rotation of the shaft.

The portion 7ᵇ of the bore 7 to one side of the applied worm 16 is transversely enlarged as at 30 and extending upwardly from the bottom or base wall of this enlarged portion 30 is a stud or fixed shaft 31. Loosely mounted on the stud or shaft 31 is a worm gear 32 operatively engaged with the worm 16.

The worm gear 32 is provided with an upstanding hub 33 which projects slightly above the upper face of the associated section S and keyed or otherwise fixed to said upper or extended portion of the hub 33 is the rotary cutter C. The cutter C as herein disclosed comprises a plurality of substantially radially disposed blades 34 and said blades are of such a length to effectively cut the standing grain or the like received between the fingers 4.

Overlying the top face of the body 3 and the smaller finger 4ᵃ of each of the sections S is a cover plate P. The inner portion of the large finger 4 of the section at its top is provided with an undercut shoulder 35 and a portion of the plate P underlies the shoulder in a manner whereby the portion of the cover plate P adjacent to the large finger 4 is substantially in continuation of the upper face of said finger. The plate P may be held to the section S in any desired manner and in order that the cutter C may have requisite rotation when the plate P is applied, the under surface of the plate P is cut away as at 36.

From the foregoing description it is thought to be obvious that a cutting mechanism for a harvesting machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A cutting mechanism for harvesters or the like comprising a bar, a plurality of separable guard sections secured to said bar, a shaft mounted within each of the sections, the shafts of the sections being substantially aligned when the sections are applied to the bar, a coupling connection between the shafts of adjacent sections when applied, the shaft of each section being provided with a worm, a worm wheel coacting with the worm of the shaft, said wheel being supported by the section, a cutting element operatively engaged with the worm wheel, the coupling connection between the shafts of adjacent sections comprising two interlocking sleeve elements, each being carried by an adjacent shaft, said coupling connection permitting the shaft sections to be disconnected when the cutter mechanism is disassembled, and means for constantly urging the interlocking sleeve elements together when in operative or assembled position.

In testimony whereof I hereunto affix my signature.

FREDERICK W. MEHLS.